United States Patent
Barniol Gutierrez et al.

(10) Patent No.: US 10,588,328 B2
(45) Date of Patent: Mar. 17, 2020

(54) HELICAL MOVEMENT DEVICE

(71) Applicant: NESTEC S.A., Vevey (CH)

(72) Inventors: Alina Maria Barniol Gutierrez, Beauvais (FR); Dominique Baccus, Compiegne (FR); Lars Lykke Espersen, Omecourt (FR); Rafal Koperek, Beauvais (FR); Adrien Gourmaud, Sainte-Eusoye (FR)

(73) Assignee: Societe des Produits Nestle S.A., Vevey (CH)

( * ) Notice: Subject to any disclaimer, the term of this patent is extended or adjusted under 35 U.S.C. 154(b) by 475 days.

(21) Appl. No.: 15/312,078

(22) PCT Filed: May 13, 2015

(86) PCT No.: PCT/EP2015/060538
§ 371 (c)(1),
(2) Date: Nov. 17, 2016

(87) PCT Pub. No.: WO2015/177008
PCT Pub. Date: Nov. 26, 2015

(65) Prior Publication Data
US 2017/0079305 A1 Mar. 23, 2017

(30) Foreign Application Priority Data
May 22, 2014 (EP) .................................... 14169522

(51) Int. Cl.
*A01J 15/00* (2006.01)
*A23G 9/08* (2006.01)
(Continued)

(52) U.S. Cl.
CPC ............... *A23G 9/08* (2013.01); *A23G 9/224* (2013.01); *A23G 9/28* (2013.01)

(58) Field of Classification Search
CPC ............. A23G 9/08; A23G 9/224; A23G 9/28
(Continued)

(56) References Cited

U.S. PATENT DOCUMENTS 3,641,783 A  2/1972  Werner
3,914,956 A * 10/1975  Knight, Jr. ............... A23G 9/12
                                                          62/343

(Continued)

FOREIGN PATENT DOCUMENTS

EP       0799575       10/1997
EP       2277386        1/2011
FR       2484278       12/1981

*Primary Examiner* — Hung D Nguyen
(74) *Attorney, Agent, or Firm* — K&L Gates LLP

(57) ABSTRACT

A frozen confection dispenser including a reservoir for receiving and holding a product to be dispensed, an evaporator with cylindrical cooling element, a movement device including a helical element arranged to rotate concentrically externally of a cooling element in such a way as to advance the product along the longitudinal axis of the cooling element, a driver engaged with the movement device for the rotation thereof, and a dispenser for dispensing of the product, wherein the helical element has an angle of attack of less than 60° relative to the longitudinal axis of the cylinder. A helical element and a method for dispensing frozen confection with a dispenser are also disclosed.

11 Claims, 8 Drawing Sheets

(51) Int. Cl.
*A23G 9/22* (2006.01)
*A23G 9/28* (2006.01)
*A23C 3/04* (2006.01)

(58) Field of Classification Search
USPC .............. 99/455, 466; 62/340, 343, 345
See application file for complete search history.

(56) References Cited

U.S. PATENT DOCUMENTS

| | | | |
|---|---|---|---|
| 3,930,535 A * | 1/1976 | Menzel | A23G 9/20 |
| | | | 62/342 |
| 4,241,590 A | 12/1980 | Martineau | |
| 2012/0055189 A1 | 3/2012 | Sipp et al. | |
| 2012/0272834 A1 | 11/2012 | Grampassi | |
| 2013/0327080 A1 | 12/2013 | Sipp et al. | |
| 2016/0030235 A1* | 2/2016 | Williamson | F25C 1/00 |
| | | | 62/340 |

* cited by examiner

SECTION A-A

Product flow

Helical element according to the invention

HELICAL MOVEMENT DEVICE

CROSS REFERENCE TO RELATED APPLICATIONS

The present application is a National Stage of International Application No. PCT/EP2015/060538, filed on May 13, 2015, which claims priority to European Patent Application No. 14169522.1, filed May 22, 2014, the entire contents of which are being incorporated herein by reference.

FIELD OF THE INVENTION

The present invention relates a frozen confection dispenser, in particular to a dispenser with a cylindrical cooling element with an evaporator surface and a movement device comprising a helical element arranged to advance the product along the longitudinal axis of the cooling element. The invention also relates to a helical element for a frozen confection dispenser.

BACKGROUND

Several type of granulator dispensers or dispensers for particulated material are on the market. Such granulator dispensers incorporate spindles in a vertical or horizontal position, and include spiral shaped scrapers encircling an evaporator, so that it simultaneously carries out a scraping and stirring function. The configuration of the granulator dispenser determines the movement of the granulated chilled, iced, partially frozen or frozen product towards a dispensing valve.

Current dispensing systems in the field of Sorbettiera type of machines are targeted to work with water based products (e.g. granite). These types of products are in the overrun range of 0-40% or below and are fat free (or very low fat) products. Typical products which are dispensed from such machines are pasty or liquid products such as drinkable water ice, granite, slush, etc.

In this type of machines the product mass is typically added at ambient temperature as liquid or liquid and powder, into a hopper in batches and stored between a couple of hours up to 10 days. The product is cooled by means of an evaporator and the product which has been cooled, is then scraped from the evaporator's cooling surface. The product is then dispensed via a dispensing valve in servings.

It has been found that Sorbettiera dispensing machines are little suited for dairy based products with 20-85% overrun. Existing machines provide issue of poor overrun stability and no control of the product behavior in the dispenser in particular if the product is stored for several days in the dispenser.

The performance of the machine depends on its throughput and to the behavior of the product in the machine. In order to achieve a reasonable throughput in terms of number of portions that can be served it is important to understand the interactions between the product and the machine.

There is therefore a need for a dispenser which allows high number of product servings per batch of product to be dispensed in particular of products with higher overrun such as e.g. an overrun from 20 to 85% without substantially loss in overrun during storage or dispensing.

SUMMARY OF THE INVENTION

Accordingly, the present invention relates to a frozen confection dispenser comprising a reservoir for receiving and holding a product to be dispensed, an evaporator with cylindrical cooling element, a movement device comprising a helical element arranged to rotate concentrically externally of a cooling element in such a way as to advance the product along the longitudinal axis of the cooling element, and driving means engaged with the movement device for the rotation thereof, and dispenser means for dispensing of the product, wherein the helical element has an angle of attack α of less than 60° relative to the longitudinal axis of the cylinder.

It was surprisingly found the dispenser according to the invention allows a gentle agitation of the product and distributes it all along the evaporator surface, while still allowing the product to be forwarded towards the dosing valve. The invention provides a reduction of the shear rate/stress by a specifically designed element, thus allowing maintaining the overrun over the dispensing period.

It has also been found that the specific design of the motion device reduces the pressure of the product in the hopper. The reduction of the pressure results in an ability to control the overrun in the hopper, in particular if the product is stored for a longer time during the dispensing period. This makes the dispenser particular suitable for dispensing of fat containing products with overrun in the range from 20-100%, more particular with an in the range from 70 to 85%.

In another aspect, the invention relates to a helical element comprising a first end adapted to be engaged with a driving means and a second end adapted to be arranged within a reservoir, wherein the longitudinal axis of the helical element is from 120 to 520 mm cm and the internal diameter is from 80 to 160 mm, and wherein the helical element has an angle of attack α of less than 60° relative to the longitudinal axis.

With the design of the helical element of the invention it has been found that it is possible to move the product without incorporating air in an excessive manner or to reducing the air in the product. The movement of the product allows the temperature distribution horizontally and vertically within close tolerances which is important for the product quality and in order to avoid product collapse. Further if the product is not moved from the evaporator surface it will freeze into ice layers, on the cooling element creating a potential blockage.

Furthermore, while the motion device according to the invention provides a gentle agitation and reduces pressure, it also avoids the formation of a slope or accumulation of product over the upstream part of the scraper. This product accumulation is non-desirable due to several mechanisms:

a. Temperature distribution is not even since the product stays on the forward part of the scraper away from the cooling element, therefore product temperature in this area will increase.

b. Mass distribution is also not even and product quality is therefore not homogeneous, therefore not controllable.

c. Product on the forward part of the scraper is prone to collapse or loss of overrun, since the surface of the product will have higher temperature and would eventually present bigger air bubble size and disproportionation of air bubble size distribution with risk of collapse and therefore liquidity.

At the same time there is a need to keep the surface of the cooling element constantly free from accumulation of ice or frozen product. This is in order to avoid ice block in the product mass, and ensure an even temperature throughout the product which may affect the product structure as well to avoid damage of scraping.

The invention thus prevents these mechanisms.

The invention further provides an improved utilization of the batch of product mass stored initially in the dispenser in terms of number of product servings.

In a further aspect, the invention relates to a method for dispensing a frozen confection comprising providing a dispenser as discussed above, providing a batch of frozen confection comprising an overrun from 20 to 100%, most preferably from 20-85%, and introducing the frozen confection into the reservoir of the dispenser, wherein the driving means provide a rotation speed of the helical element of 16 to 50 rpm, and the cooling element has a surface cooling temperature between −1 and −20° C.

DETAILED DESCRIPTION OF THE INVENTION

According to the invention the product is added to the machine in partially frozen form with a given predefined starting overrun. In a preferred embodiment of the invention it is not desirable to increase or decreasing the overrun during storage and dispensing from machine, within the range of 20 to 85%.

The invention differs from already known dispensing machines in the following ways: part of the existing machines is designed to produce typically water based products (slush, granite type); others are designed to produce the mix from a dry base and then incorporate the air. The scraper function in these machines to remove frozen mix from the evaporator surface as ice layers builds onto the evaporator surface. The invention on hand does not only remove the frozen mix from the cylinder, but in addition to that provides gentle agitation and reduced shear stress.

The invention addresses the different issues by the design of the helical element. In particular it has been found that the invention works with a dairy based formula that contains fat (ca. 8%). Fat is very sensitive to shear, once the shear rate is too high, the risk of unstable overrun is very high, leading to collapse of the product volume.

Figure 1A:
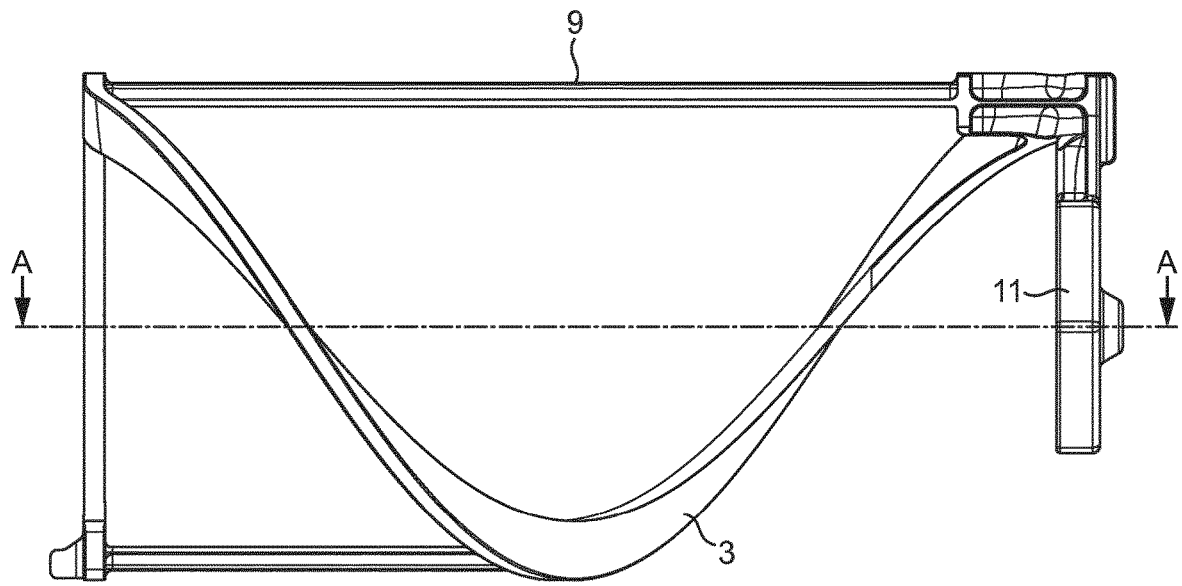
FIGS. 1A and B show side views of an embodiment of the helical element according to the invention.
Figure 1B:
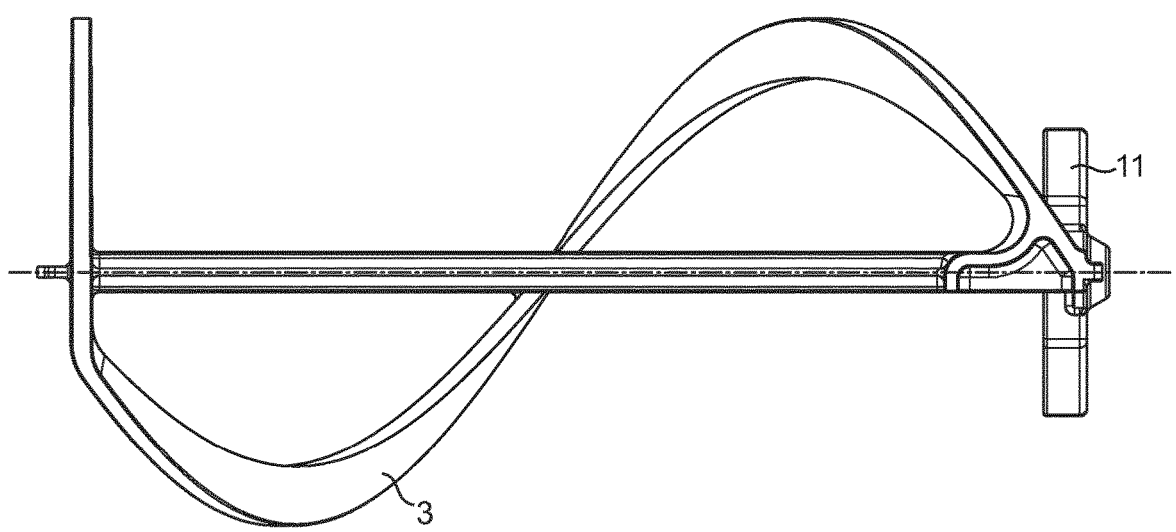
FIG. 1 C shows a cut through view of the embodiment of the helical element of FIGS. 1A and B and defines the angle of attack α.
Figure 1C:
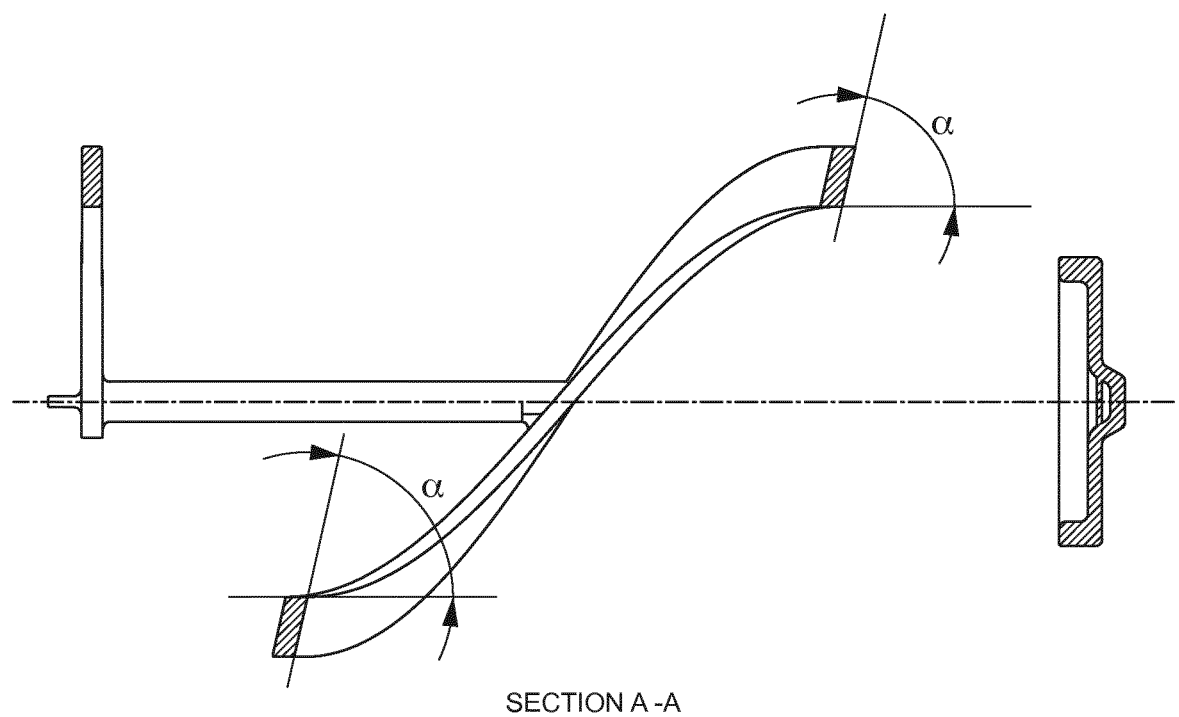

By α angle of attack is meant the angle of inclination of the helical element relative to the longitudinal axis of the cylinder as can be seen in FIG. 1C.

Further in the present context unless otherwise indicated % of a component means the % of weight based on the weight of the product i.e. weight/weight %.

Overrun relates to the amount of air whipped in to an ingredient mix for preparing aerated products. Overrun is a term generally recognized for the skilled person within the field of ice cream production and in the present invention overrun is defined as the increase in volume, in percentage, of ice cream greater than the volume of the mix used to produce that ice cream. In other words, if 1 liter of mix is aerated to make 2.0 liters of ice cream, it is increased in volume by 100% (i.e., the overrun is 100%).

The dispenser according to the invention comprises a movement device comprising a helical element arranged to rotate concentrically externally of a cooling element in such a way as to advance the product along the longitudinal axis of the cooling element. The movement device may comprise engagement means for engaging and fixing the helical element. Driving means are provided to engage with the movement device for the rotation thereof. The driving means are preferably in the form of a motor which can be coupled to the movement device via a driving shaft. In a preferred embodiment of the invention the movement device is simply the helical element with is designed so that it can be coupled directly with the driving means. Advantageously in this embodiment of the invention the helical element is provided with an end part which is engaged with the driving means. Driveshaft and helical element connects by means of a slatted opening in the helical element and a corresponding shape on the driveshaft.

Figure 6:
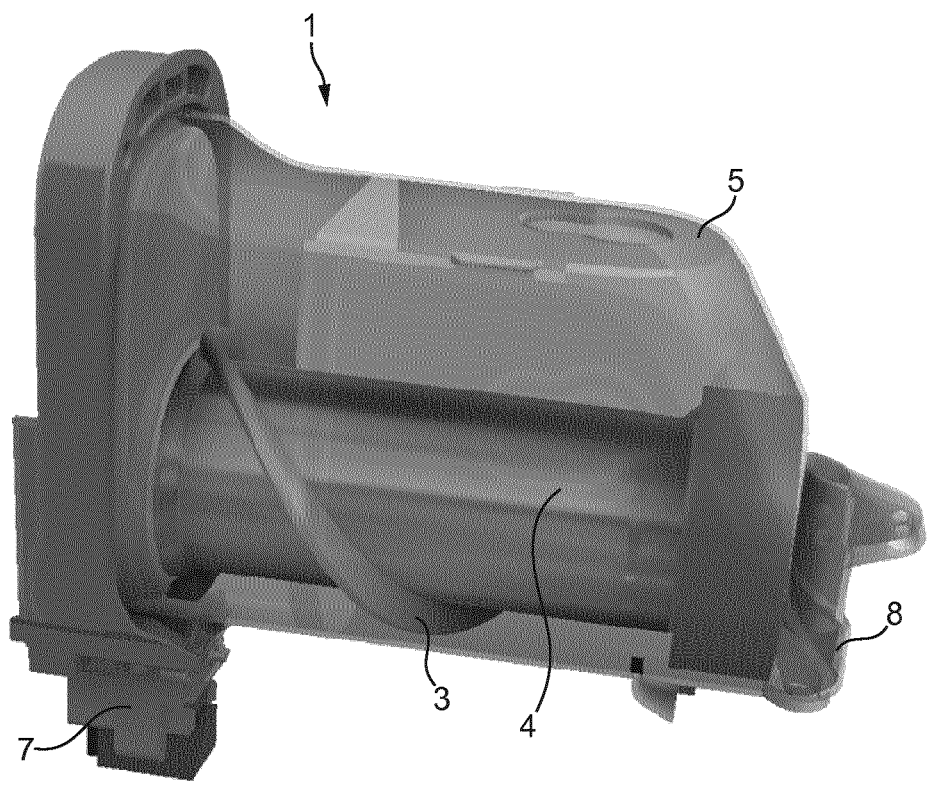
FIG. 6 shows a principle perspective presentation a dispenser according to the invention.
Figure 7:
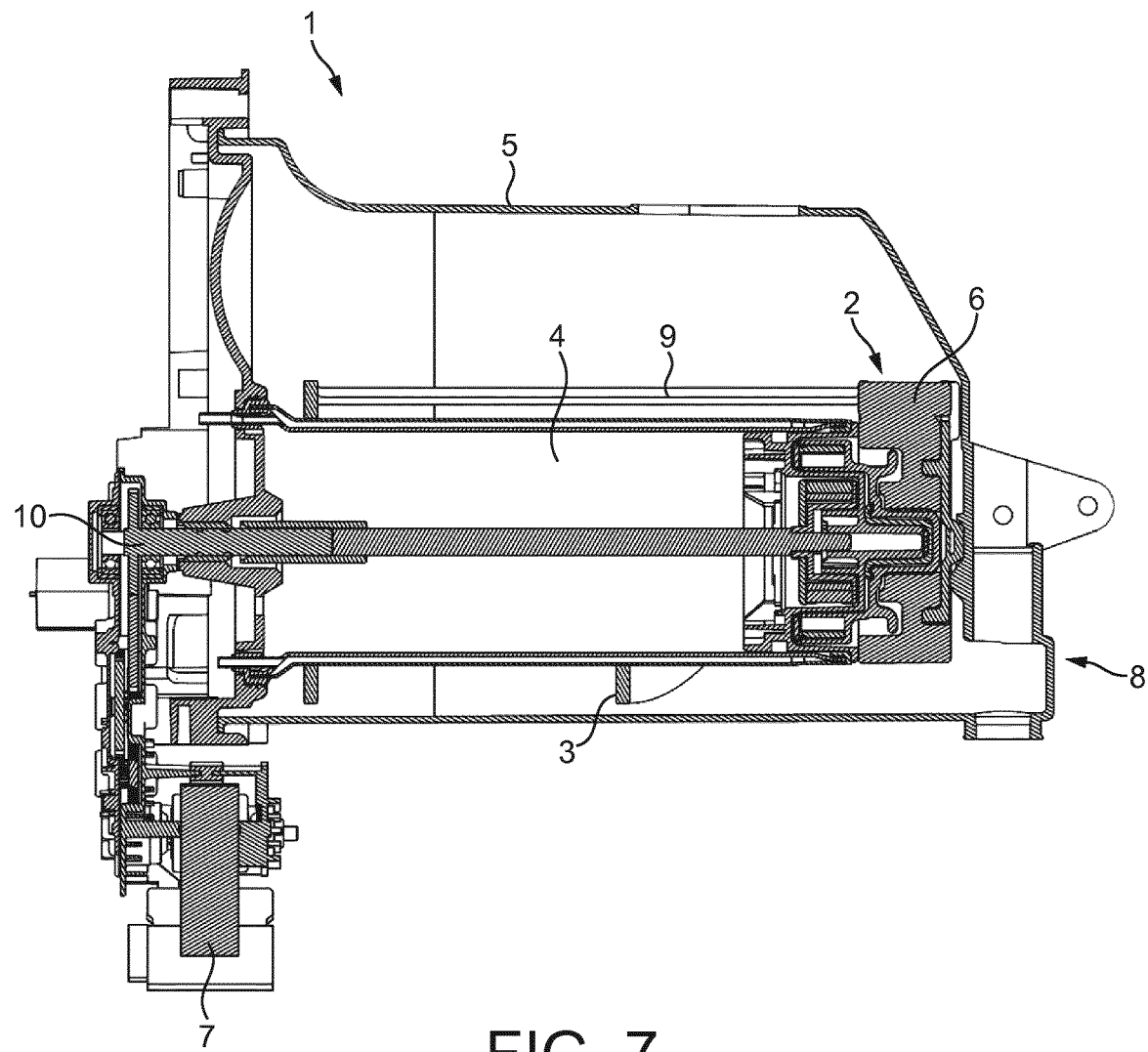
FIG. 7 shows a cut through schematic side view of a dispenser according to the invention.

FIGS. 6 and 7 show views of the dispenser (1) according to the invention comprising a reservoir (5) for receiving and holding a product to be dispensed, an evaporator with cylindrical cooling element (4), a movement device (2) comprising a helical element (3) arranged to rotate concentrically externally of a cooling element (4) in such a way as to advance the product along the longitudinal axis of the cooling element (4), and driving means (7) comprising a driving shaft (1) engaged with the movement device (2) for the rotation thereof, and dispenser means (8) for dispensing of the product. The dispensing means (8) is preferably a valve. A support bar is provided to reinforce the helical element (3). An extension element (6) is provided to ensure the same lengths of the cooling element and the helical element. The cooling element extracts the heat from the product. The single revolution helical element provides a gentle agitation, thus allowing for even temperature distribution and controlled overrun over time.

During the operation of the dispenser (1) the product is stored in the reservoir e.g. from 1 hour up to 10 days. The partially frozen product is stored and then dispensed through the valve. The helical element rotates constantly to moving away the layers of frozen product from the surface of the cylindrical cooling element (4). In addition to that, the helical element of the movement device aids the product to advance towards the front of the hopper and to the dispensing valve during the serving period. Product can be dispensed once the valve is in open position.

Figure 2:
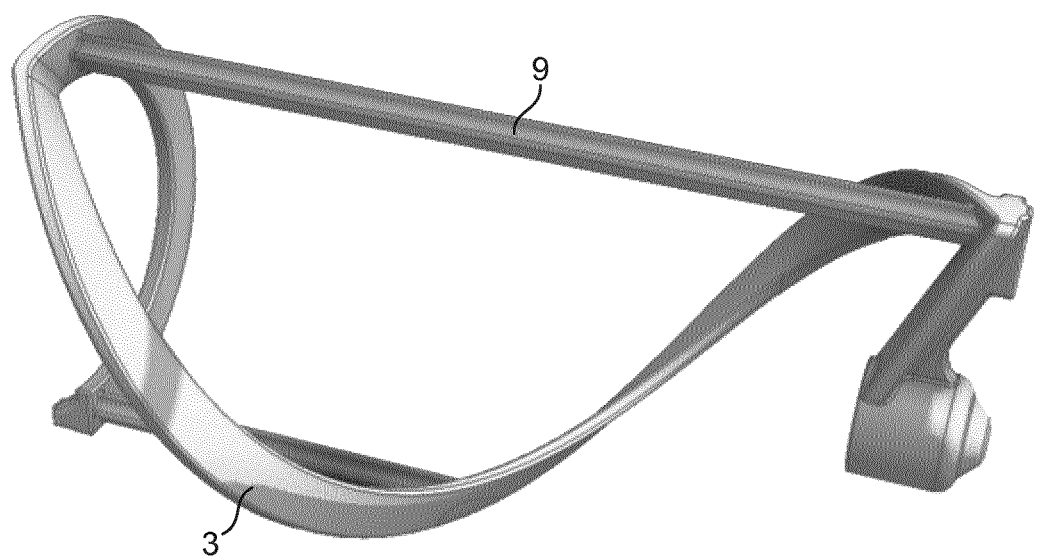
FIG. 2 shows a perspective view of the helical element of FIG. 1.
Figure 3:
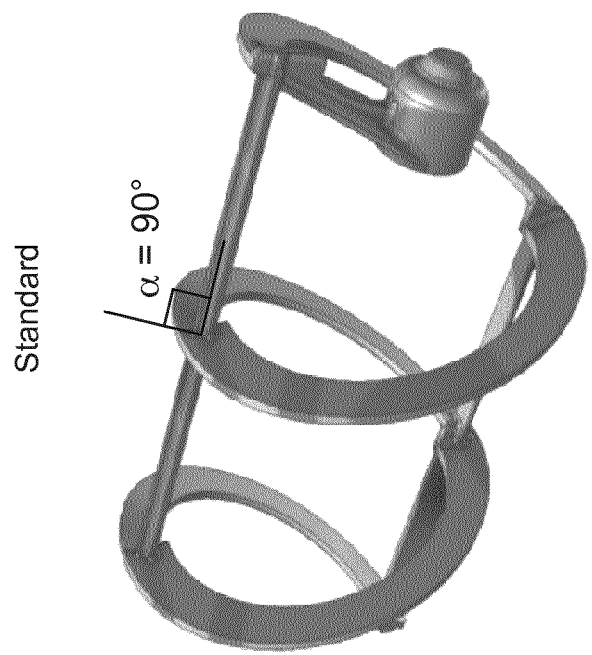
FIG. 3 shows a traditional helical element with an picture of product surface distribution resulting from its use.
Figure 3:
Figure 4:
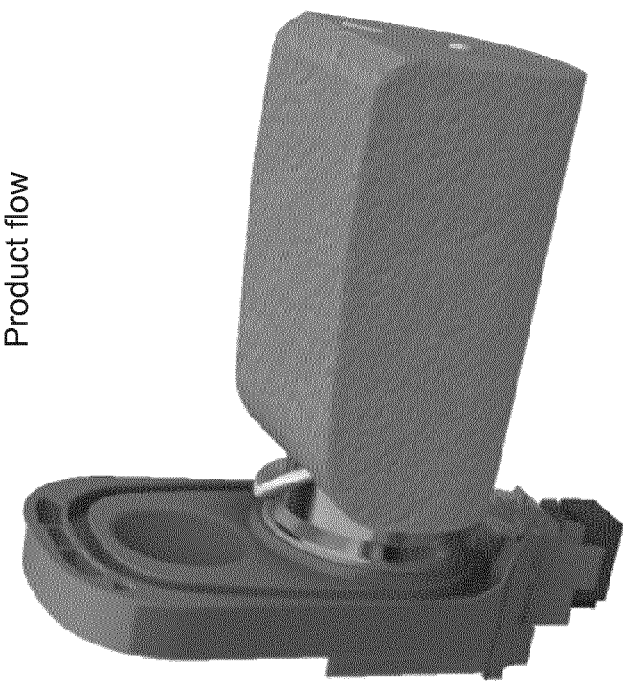
FIG. 4 shows the single revolution helical element with an picture of product surface distribution resulting from its use.
Figure 4:
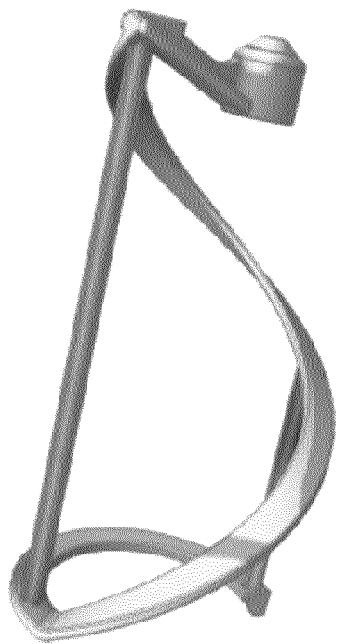
Figure 5:
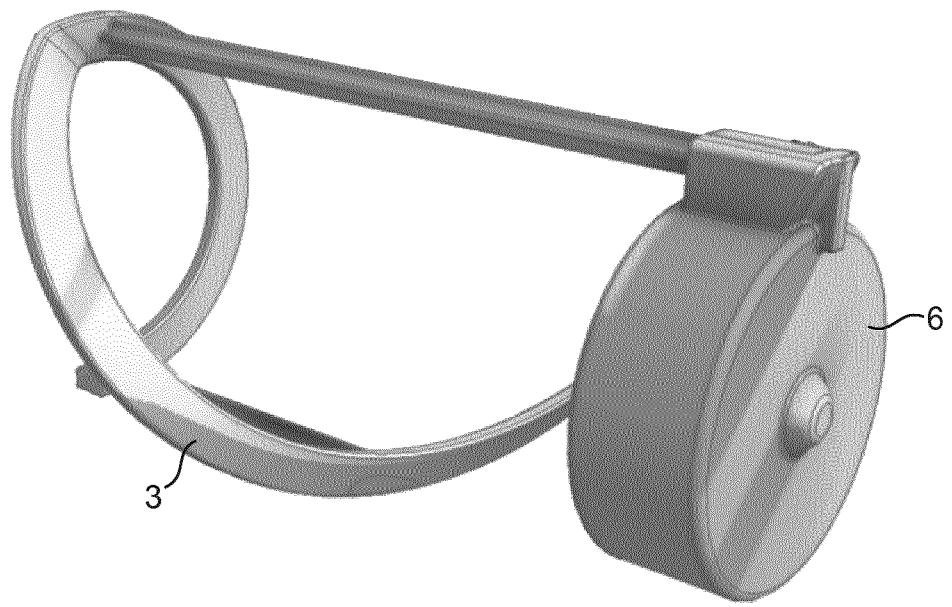
FIG. 5 shows an embodiment of the single revolution helical element with a displacer element.

In a preferred embodiment of the invention the helical element has between 0.25 and 1.5 turns over the length of the cylindrical cooling element over the length of the cylindrical cooling element. The resulting angle of attack α described in the FIG. 1C is a variable of the number of turns and length of helical element. A particular preferred embodiment of invention the helical element has 1 turn along the length of the cooling element. Such a helical element is shown in FIG. 2. In this embodiment the length of the cooling substantially corresponds to the pitch length of the helical element. This design of the helical element has been found to provide a gentle movement of the product in the reservoir without neither destroying nor building overrun of the product.

Preferably the helical element has a flight with a high of 4 to 50 mm, more preferably from 6 to 12. The preferred thickness is 0.3 to 15 mm, more preferably between 3 and 8 mm.

Depending on the thickness of the helical element, it may be provided with one or more structures to reinforce the stability of the helical element. For example such structure may be in the form of a bar (9) provided between the front and rear end of the helical element as shown in FIG. 1A-1B and FIG. 2.

To ensure a gentle handling while good cooling of the product the helical element is arranged with a clearance distance to the cylindrical cooling element between 0.1 and 3 min so as to allow product mix to pass between cylinder and helical element. In a preferred embodiment the helical element is free from scrapers other than the scraping which is performed by the helical element turning about the cooling cylinder. This avoids a reduction of the overrun of the product.

A dispenser according to the invention preferably has a cooling element that is from 100 to 500 min long, preferably between 200 and 400 mm long. A dispenser according to the inventor has an evaporator with cylindrical cooling element. The evaporator may be an evaporator conventionally used in dispensing devices for Sorbettiera type machines. The cooling capacity of the cylindrical cooling element is preferably between 0.05 and 1.0, more preferably about 0.5 kW.

Advantageously the dispenser according to the invention has a helical element wherein the length of the helical element corresponds substantially to the length of the cooling element. This provides a complete removal of the product from the surface of the cooling element. However dispensers exist where helical elements extends beyond the cooling element leaving a dead-space of products where the product is not agitated. In such embodiments of the invention wherein the helical element is longer than the cylindrical cooling element an extension element is preferably provided between the end of the cooling element and end of helical element to displace non cooled product.

The reservoir of the dispenser may have volumes adapted to the use of the dispenser. A suitable size of reservoir for frozen confection is adapted to comprising from 1 to 10 litre product.

The dispenser is provided with dispensing means for dispensing the product. Preferably this is for dispensing of the product into single servings. A valve with a removable piston may advantageously be used for this to allow easy cleaning thereof.

A frozen confection dispenser which is a dispenser for a partially frozen product water or dairy based. For example slush, granite, ice cream, milk shake or crushed ice drinks. In a particular preferred embodiment of the invention the frozen confection comprises A preferred formulation of the frozen confection comprises 12-20% wt of sugar, 6-12% wt. of fat, and 1-4% of protein. The water content of this formulation is preferably in the range of 55 to 70 and the overrun from 20 to 85%.

The invention also relates to a helical element comprising a first end adapted to be engaged with a driving means and a second end adapted to be arranged within a reservoir, wherein the longitudinal axis of the helical element is from 120 to 520 mm cm and the internal diameter is from 80 to 160 mm, and the helical element has an angle of attack α of less than 60°, preferably between 45° and 50°, relative to the longitudinal axis of the cylinder. The advantages of this helical element are discussed above.

EXAMPLES

By way of example and not limitation, the following examples are illustrative of various embodiments of the present disclosure.

For the experiments two product dispensers: 1) a conventional product dispenser (Bras Sorbettiera 4R1155-OD1-999) with a helical element having 2 windings along the length of the cooling element and an angle of attack at 90° and one dispenser according to the invention having a single winding of the helical element about the cooling element.

A bag of 4.7 litres of product is introduced into the containers of the dispensers. The product is semi melted ice cream or dairy based product that is squeezed from the bag and introduced in to the container while is gently agitated for a couple of hours up to 10 days. The texture is a cold creamy drinkable coffee ice cream/or coffee diary base. The product comprises 12-20% wt. of sugar, 6-12% wt. of fat, and 1-4% wt. of protein.

The experiments are performed over 2 days serving period time. Servings of 100 ml are dispensed into paper cups. After the starting dose is dispensed servings are dispensed every 20 minutes and the overrun and temperature of the in-cup product are measured. During the first day 16 portions are dispensed and a resting time for the remaining product of exactly 16 hours (e.g. overnight) is respected. The second day starts after the 16 hours resting time with the first measurement (overrun and temperature) of the first serving (or the product in the dispenser). The frequency for serving doses is 20 min. The dosing continues until the machine is either empty, the machine blocks because product freezes on the cylinder or the overrun falls to 20%. For each cup product overrun and product temperature is corrected; All these measurements refer to the in-cup quality and quantity of the served product.

Overrun is defined as the percent of expansion of ice cream achieved from the amount of air incorporated into the product during a process. An overrun of 50% means that it has expanded 50%. In other words a measure of the volume of air incorporated into the ice cream mix.

Figure 8:
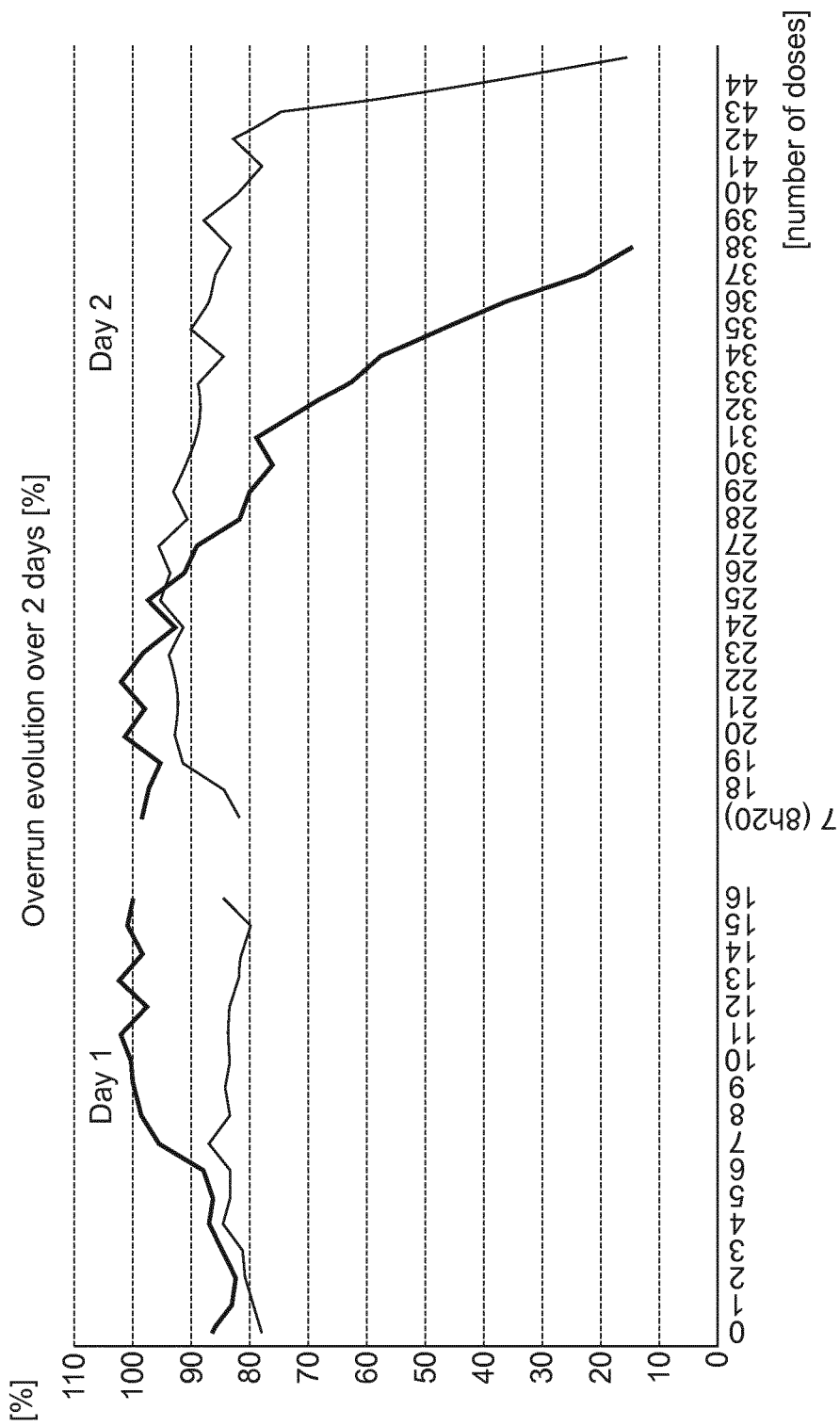
FIG. 8 shows overrun evolution over time for a according to the invention and for a traditional dispenser and the dispenser according to the invention.
Figure 9:
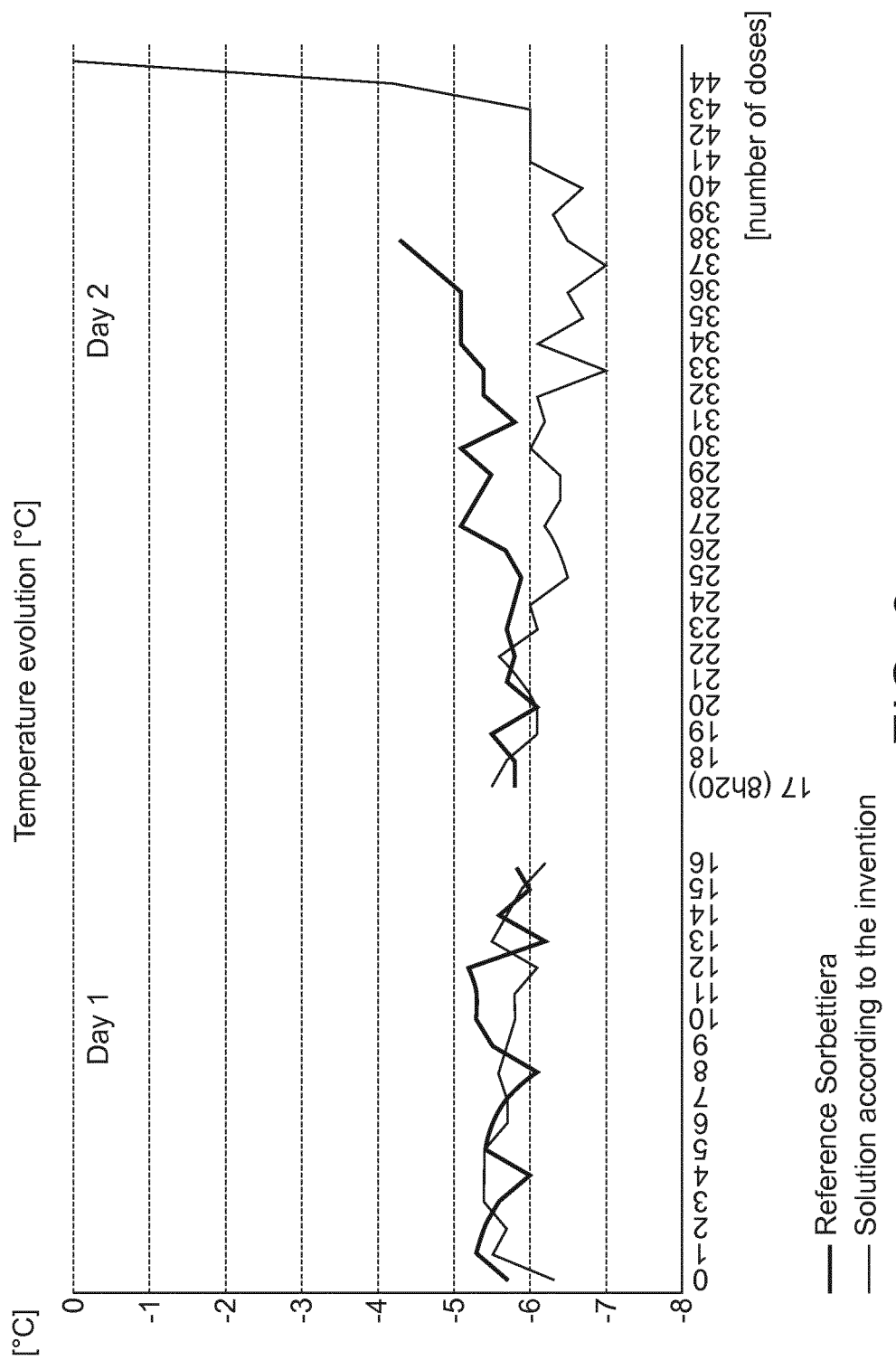
FIG. 9 shows temperature distribution over time for a according to the invention and for a traditional dispenser and the dispenser according to the invention.

FIGS. 8 and 9 show one example for a 2-days test performed on a standard machine (grey line) against the dispenser according to the invention (in black). On the x-axe the number of doses on the y-axe the percentage of overrun are represented. In this example it is possible to observe that overrun is more stable for the dispenser according to the invention thus leading to more portions. In this case the overrun is also more stable for longer period of time.

Results with the standard machine provide 32-34 portions of 100 ml, while the dispenser according to the invention provides 39-41 portion of 100 ml.

The following example shows the performance of the single revolution helical element over 2 days' time. The performance is expressed in terms of overrun as a function of time and number of doses. The x-axe shows the number of portions and the y-axe the overrun in percentage.

They black (bold) curve represents the existing machine performance and the grey line the solution according to the invention. The black (bold) line shows that the overrun is much more unstable over time. The overrun increases excessively during the first day and collapses much earlier during the second day, this providing less portions. The grey line describes a much more stable overrun over a longer period of time. In consequence the number of portions obtained with the solution is higher and with a consistent overrun which give a better quality of the product.

Temperature stability over time in the container and the in-cup temperature were also measured. The following graph shows the in-cup temperature over the 2-days testing period. The x-axe shows the number of portions and the y-axe the temperature in degree Celsius.

The black line represents the standard existing dispensing machine and the grey the dispenser according to the invention. In the standard machine the heat exchange is found to be less efficient and the heat exchange surface is less utilized leading to inconsistent and higher in-cup temperatures. The grey line shows the temperature evolution according to the invention. It is found that thanks to the better utilization of the cooling element surface the heat extraction is more efficient, the mass can be cooled down to a temperature where the overrun is more stable and the in-cup temperature is also more stable over the full dispensing period. This allows more servings of a better and consistent quality to be dispensed. The dispenser according to the invention allowed 44 servings to be dispensed while with the standard machine 38 doses were dispensed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A frozen confection dispenser comprising:
a reservoir for receiving and holding a product to be dispensed;
an evaporator with a cylindrical cooling element;
a movement device comprising a helical element arranged to rotate concentrically externally of the cylindrical cooling element in such a way as to advance the product along a longitudinal axis of the cylindrical cooling element;
a driver engaged with the movement device for rotation of the movement device;
a dispenser for dispensing the product; and
the helical element has an angle of attack $\alpha$ of less than 60° relative to the longitudinal axis of the cylindrical cooling element, the angle of attack $\alpha$ is an angle of inclination of the helical element relative to the longitudinal axis of the cylindrical cooling element, wherein the helical element has between 0.25 and 1.5 turns over a length of the cylindrical cooling element, and the helical element is arranged with a clearance distance to the cylindrical cooling element between 0.1 and 3.0 mm.

2. The frozen confection dispenser according to claim 1, wherein the helical element has an angle of attack $\alpha$ between 45° and 50° relative to the longitudinal axis of the cylindrical cooling element.

3. The frozen confection dispenser according to claim 1, wherein the helical element has a flight with a high of 6 to 12 mm and a thickness of 0.3 to 15 mm.

4. The frozen confection dispenser according to claim 1, wherein the cylindrical cooling element is from 100 to 500 mm long.

5. The frozen confection dispenser according to claim 1, wherein the helical element is free of scraper elements dragging along a surface of the cylindrical cooling element.

6. The frozen confection dispenser according to claim 1, wherein a cooling capacity of the cylindrical cooling element is between 0.05 and 1.0 kW.

7. The frozen confection dispenser according to claim 1, wherein a length of the helical element corresponds substantially to the length of the cylindrical cooling element or is longer than the length of the cylindrical cooling element or extends through a full length of the reservoir.

8. The frozen confection dispenser according to claim 7, wherein the helical element is longer than the cylindrical cooling element, and an extension element is provided between an end of the cylindrical cooling element and an end of the helical element to displace at least a portion of the product that has not been cooled.

9. The frozen confection dispenser according to claim wherein the reservoir is adapted to comprise from 1 to 10 liters of the product.

10. The frozen confection dispenser according to claim wherein the dispenser comprises a valve with a removable piston.

11. The frozen confection dispenser according to claim 1, wherein the helical element extends from 120 to 520 mm along a length of a longitudinal axis of the helical element and the helical element has an internal diameter from 80 to 160 mm.

* * * * *